United States Patent
Tsirkin et al.

(10) Patent No.: US 10,866,814 B2
(45) Date of Patent: *Dec. 15, 2020

(54) EFFICIENT INSTANTIATION OF ENCRYPTED GUESTS

(71) Applicant: Red Hat, Inc., Raleigh, NC (US)

(72) Inventors: Michael Tsirkin, Westford, MA (US); David Hildenbrand, Grasbrunn (DE)

(73) Assignee: Red Hat, Inc., Raleigh, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 16/799,299

(22) Filed: Feb. 24, 2020

(65) Prior Publication Data

US 2020/0192678 A1    Jun. 18, 2020

Related U.S. Application Data

(63) Continuation of application No. 16/116,074, filed on Aug. 29, 2018, now Pat. No. 10,572,271.

(51) Int. Cl.
*G06F 9/455* (2018.01)
*G06F 9/445* (2018.01)
(Continued)

(52) U.S. Cl.
CPC .......... *G06F 9/445* (2013.01); *G06F 9/45558* (2013.01); *G06F 12/1408* (2013.01);
(Continued)

(58) Field of Classification Search
CPC .... G06F 9/45558; G06F 9/455; G06F 9/4401; G06F 2009/45583; G06F 2009/4557; G06F 2212/1052
See application file for complete search history.

(56) References Cited

U.S. PATENT DOCUMENTS 6,760,840 B1    7/2004 Shimbo et al.
8,689,211 B2    4/2014 Agbaria et al.
(Continued)

OTHER PUBLICATIONS

Live Migration of Virtual Machines; by Christopher Clark et al.; University of Cambridge Computer Laboratory, Cambridge UK, and Department of Computer Science, University of Copenhagen, Denmark; https://www.usenix.org/legacy/event/nsdi05/tech/full_papers/clark/clark.pdf; retrieved Jul. 4, 2018 (14 pages).

(Continued)

*Primary Examiner* — Emerson C Puente
*Assistant Examiner* — Zhi Chen
(74) *Attorney, Agent, or Firm* — K&L Gates LLP

(57) ABSTRACT

Efficient instantiation of encrypted guests is disclosed. In an example, a first host with a first hypervisor is separated from a second host with a second hypervisor by a network. The first hypervisor executes to allocate a requested amount of memory associated with a first guest on the first host. Pages of the requested amount of memory written to by a boot process of the first guest are tracked. The second hypervisor is requested to allocate the requested amount of memory on the second host. All tracked pages written to by the boot process are transferred to the second host. In response to transferring all of the tracked pages, a transfer completion confirmation is sent to the second hypervisor and a second guest that is a migrated copy of the first guest is instantiated on the second host with the transferred pages from the first guest.

20 Claims, 9 Drawing Sheets

(51) Int. Cl.
*G06F 12/14* (2006.01)
*G06F 9/4401* (2018.01)
*H04L 9/08* (2006.01)

(52) U.S. Cl.
CPC .... *G06F 9/4401* (2013.01); *G06F 2009/4557* (2013.01); *G06F 2009/45583* (2013.01); *G06F 2212/1052* (2013.01); *H04L 9/0894* (2013.01)

(56) References Cited

U.S. PATENT DOCUMENTS

| | | |
|---|---|---|
| 8,868,796 B1 | 10/2014 | Wojcik et al. |
| 9,727,368 B1 | 8/2017 | Tsirkin et al. |
| 10,230,785 B1 | 3/2019 | Gadalin et al. |
| 2015/0052517 A1* | 2/2015 | Raghu ............... H04L 12/4641 718/1 |
| 2017/0004003 A1 | 1/2017 | Coles et al. |
| 2018/0121112 A1 | 5/2018 | Imazaki et al. |
| 2018/0136971 A1 | 5/2018 | Dong et al. |
| 2018/0247082 A1 | 8/2018 | Durham et al. |
| 2019/0012110 A1 | 1/2019 | Okano et al. |
| 2019/0340003 A1* | 11/2019 | Ramanathan ......... G06F 9/4856 |

OTHER PUBLICATIONS

Optimized Pre-Copy Live Migration for Memory Intensive Applications; by Khaled Z. Ibrahim et al; Lawrence Berkley National Laboratory; https://dl.acm.org/citation.cfm?id=2063437; retrieved Jul. 4, 2018 (11 pages).

* cited by examiner

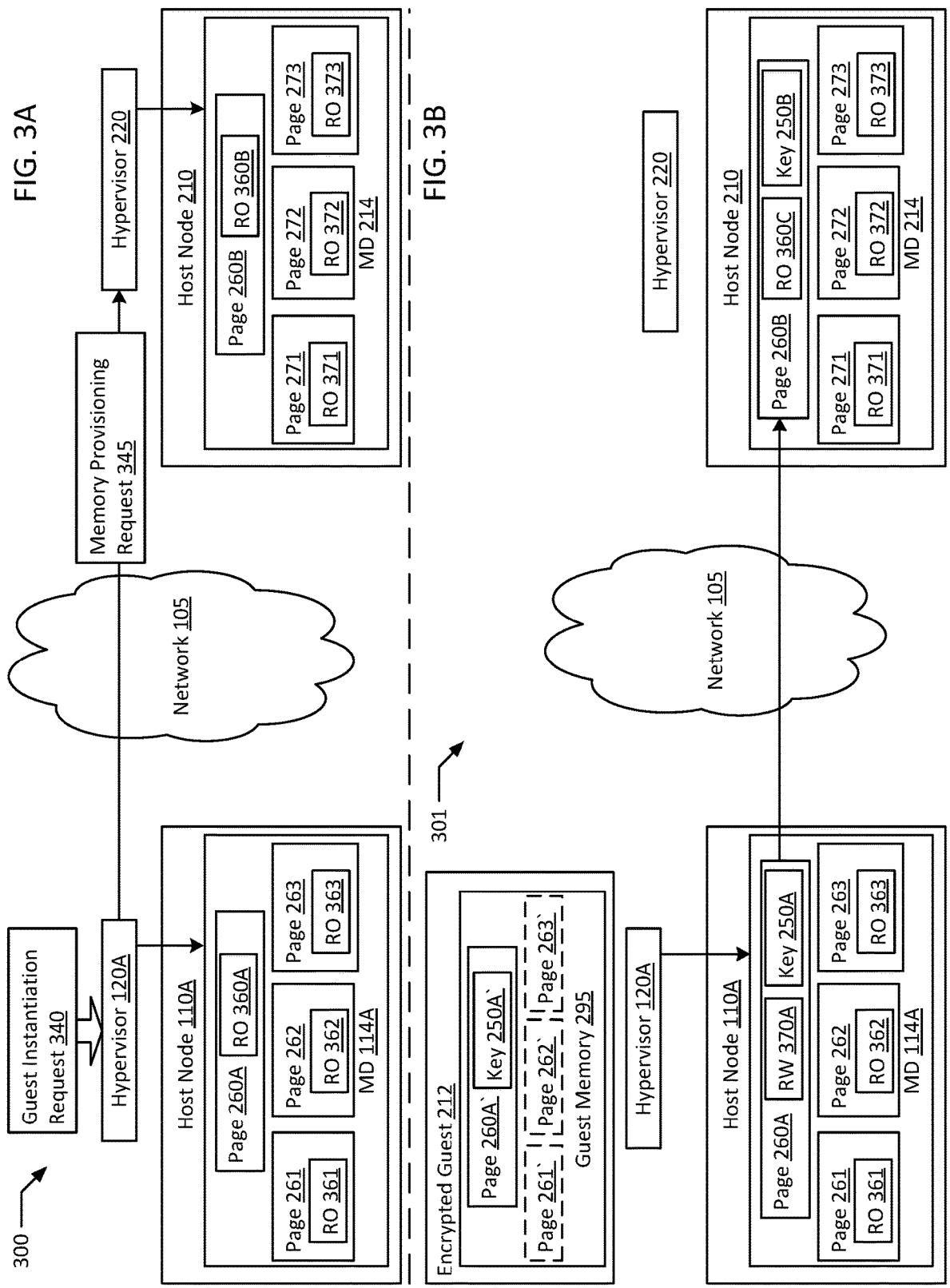

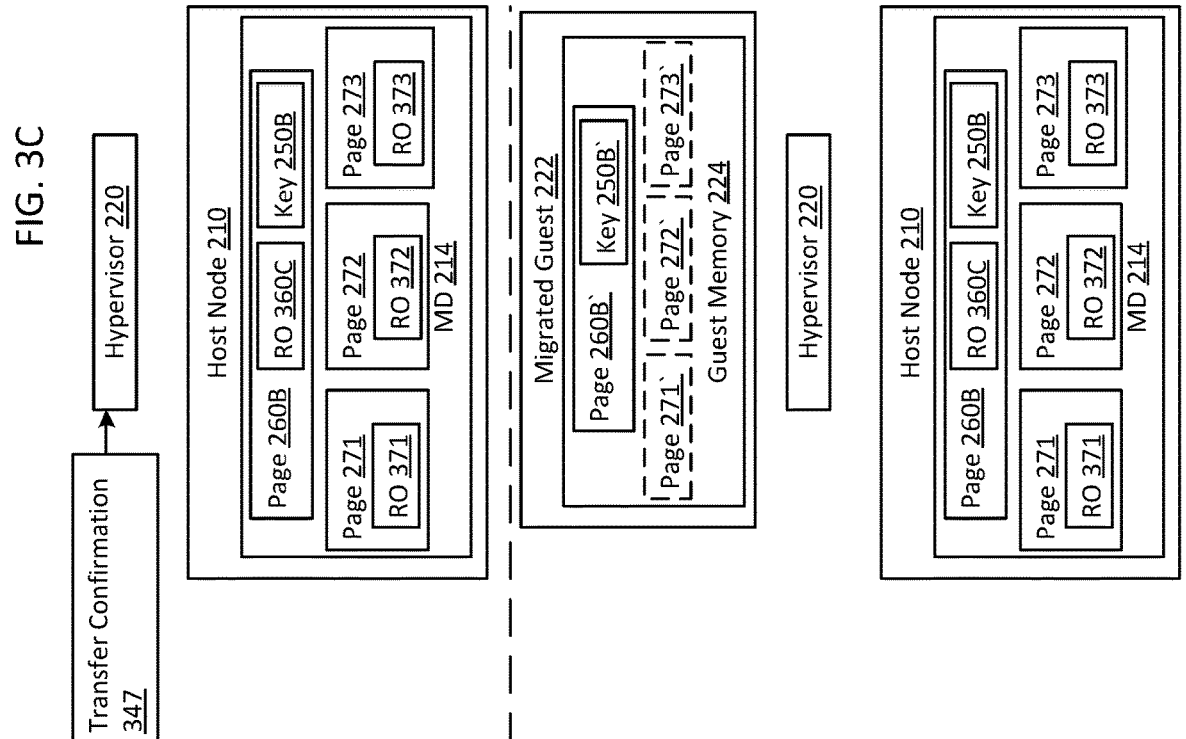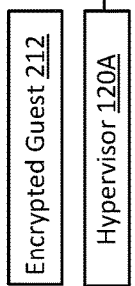

EFFICIENT INSTANTIATION OF ENCRYPTED GUESTS

CROSS REFERENCES TO RELATED APPLICATIONS

This application is a continuation of and claims priority to and the benefit of U.S. patent application Ser. No. 16/116,074, filed on Aug. 29, 2018, the entire content of which is hereby incorporated by reference herein.

BACKGROUND

The present disclosure generally relates to virtualized computer systems, for example, virtualized computer systems deployed in multi-tenant cloud environments. For scalability and efficiency reasons, many computer systems employ virtualized guests such as virtual machines and containers to execute computing tasks performed by the computing systems, such as for hosting application programs. Typically, guests such as containers and virtual machines may be launched to provide extra compute capacity of a type that the guest is designed to provide, while isolating compute resources used by different users and tenants away from those of other users. Guests enable a programmer to quickly scale the deployment of applications to the volume of traffic requesting the applications, and they may be deployed in a variety of hardware environments. Multiple guests may also be clustered together to perform a more complex function than the respective containers are capable of performing individually. For high security processing tasks dealing with sensitive data, guests may be deployed with encrypted memory to further assure data security and to protect such sensitive data from other users and tenants of the hosts hosting the encrypted guests.

SUMMARY

The present disclosure provides a new and innovative system, methods and apparatus for efficient instantiation of encrypted guests. In an example, a first host has a processor and a first hypervisor and a second host with a second hypervisor is separated from the first host by a network. The first hypervisor executes on the processor to allocate a requested amount of memory associated with a first guest on the first host. As the first guest boots, pages of the requested amount of memory written to by a boot process of the first guest are tracked. The first hypervisor requests the second hypervisor to allocate the requested amount of memory on the second host. All tracked pages written to by the boot process are transferred to the second host. In response to transferring all of the tracked pages, a transfer completion confirmation is sent to the second hypervisor and a second guest that is a migrated copy of the first guest is instantiated on the second host with the transferred pages from the first guest.

Additional features and advantages of the disclosed method and apparatus are described in, and will be apparent from, the following Detailed Description and the Figures.

BRIEF DESCRIPTION OF THE FIGURES

FIGS. 3A-D are block diagrams illustrating a system performing an efficient instantiation of encrypted guests workflow according to an example of the present disclosure.

DETAILED DESCRIPTION OF EXAMPLE EMBODIMENTS

Figure 1:
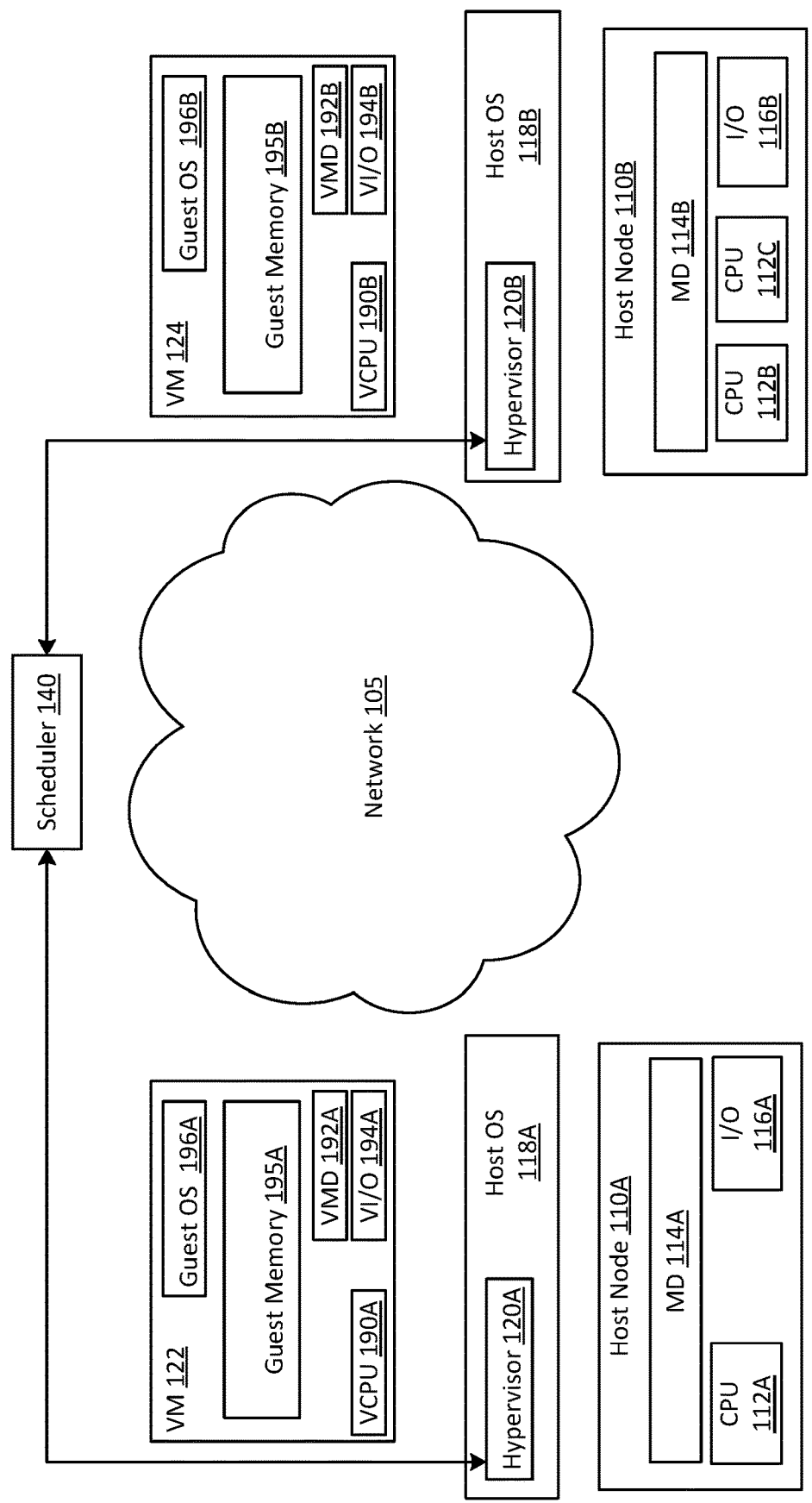
FIG. 1 is a block diagram of a virtualized system configured for efficient instantiation of encrypted guests according to an example of the present disclosure.

Typically, in computer systems utilizing isolated guests, virtual machines and/or containers are used. In an example, a virtual machine ("VM") may be a robust simulation of an actual physical computer system utilizing a hypervisor (e.g., Red Hat® KVM and Red Hat® KVM hypervisor) to allocate physical resources to the virtual machine. In some examples, a container based virtualization system such as Red Hat® OpenShift® or Docker® may be advantageous as container based virtualization systems may be lighter weight than systems using virtual machines with hypervisors. A container will often be hosted on a physical host or virtual machine that already has an operating system ("OS") (e.g., Red Hat Enterprise Linux®) executing, and the container may be hosted on the operating system of the physical host or VM. Virtualization may allow parallel deployment of computing power to more efficiently utilize computing power for a given set of physical hardware.

Due to economies of scale, computing hardware may be more economical to deploy in large scale data centers such as in a private or multi-tenant cloud environment. In an example, physical and/or virtual host nodes may each host dozens or hundreds of guests, each of which may independently execute tasks. In an example, a guest such as a VM or container may be required to be migrated from one host to another, whether the host is physical or virtual. For example, a given host may be overloaded from a compute capacity perspective and some of its isolated guests may be migrated to a less busy host, or related isolated guests may be migrated to a shared host for network latency efficiencies when a host with sufficient capacity is located. A potential weakness for multi-tenant clouds is that a given host may often host guests belonging to multiple tenants with different security requirements. In such environments, a supervisor of a given host may have access to data of guests requiring higher security that may potentially be suborned by a malicious actor through a guest with a lower risk security profile sharing the same host. Encryption is one such security feature that provides additional data security for guests. However, a host supervisor or a hypervisor providing virtualized computing resources to the guests on a given host may typically be required to have access to the encryption keys of the guests the host, since such encryption is typically implemented prior to the guest being instantiated. In a shared environment, allowing encryption keys for other guests to be accessible to supervisors (e.g., a shared hypervisor or host operating system) is a security risk in that it leaves a potential route for attack for gaining unauthorized access to data. Therefore it would be preferable to avoid trusting a public cloud hypervisor with guest encryption keys for highly secure guests. In practice, however, this is rarely practical because a hypervisor needs to be able to read a guest's memory to boot up the guest, and therefore would have the encryption key of each guest that is launched on the system managed by the hypervisor. In addition, during the boot process, a hypervisor typically also needs to write to the guest's memory, which typically requires the hypervisor to have full, unencrypted access to the guest's memory.

Typically, once a guest has been instantiated and the guest is up and running, the guest may execute and manage its own memory with a copy of its encryption key stored in guest memory, only accessible to the processor(s) handling the guests' computing tasks. For example, in certain processor architectures, a CPU register may be configured to store guest encryption keys, allowing a hypervisor that is unable to read the contents of memory pages to perform translation between virtual and host memory addresses, since the contents of retrieved pages may be decrypted by the processor(s) directly at execution time and re-encrypted prior to being stored back in memory. For example, the hypervisor need not know the contents of a given page or block of memory to retrieve the respective page or block requested by a guest. In such examples, encryption keys may be stored in an identifiable location in guest memory (e.g., metadata associated with the guest, an initial file location written to during bootup, etc.). An encrypted guest may be migrated from one host to another after it has been launched. Therefore, in such examples, after migration a hypervisor of a receiving host need not have access to the guest's encryption key since the guest has already been booted up. However, migrating an encrypted guest presents issues with maintaining proper execution states for the guests involved, because the receiving hypervisor may lack access to the contents of the memory pages of the guest.

A guest typically requires a significant portion of its memory pages to be located on a given host in order to execute properly. Therefore, during migration, a threshold portion of the guest's current execution state in the form of memory pages may typically be transferred to a new host prior to execution of the guest beginning on the new host. However, the guest's state is constantly changing as it is executing, therefore presenting a moving target for transmission and migration. With a non-encrypted guest, this is a problem that may typically be overcome by performing lazy migration where after enough memory pages have been transmitted to the new host to start execution, the remaining memory pages are only retrieved on demand (e.g., when a memory fault occurs on the new host due to a missing page). This is typically acceptable in a non-encrypted guest since retrieval is only required for those limited situations where an in use page of memory was not yet transferred. However, this type of migration becomes much less practical with an encrypted guest where the receiving hypervisor lacks access to the guest's encryption key, because the hypervisor may be unable to precisely determine whether a given page actually needs to be retrieved. With an unencrypted guest, a request to access a new, unused page may be handled by the hypervisor directly by mapping an unused page on the new host. However, if the hypervisor lacks access to read guest memory, it may be unable to determine the difference between a blank page and a page with data due to the encryption. Therefore every single page would typically need to be transferred, which presents a significant amount of overhead especially for newly launched guests with large, mostly empty memory spaces. The un-migrated pages (including blank encrypted pages) would still need to be hosted on the previous host of the guest, and since the destination hypervisor would lack access to the contents of a given page, the destination hypervisor would end up retrieving empty encrypted pages to be stored locally before allowing new data to be saved to those pages, which would defeat any advantage of implementing lazy migrations. A basic migration strategy may be to suspend execution of the guest until the memory pages associated with the guest are transferred to a new host, but this type of transfer may result in a prolonged downtime for the guest, ranging from a minute to upwards of an hour.

Typically migration strategies may be divided into pre-copy migration, where memory pages comprising the current state of a guest are migrated to a new host while the host continues execution on the old host, and post-copy migration, where the guest is launched on the new host and the state is transferred on an as-needed basis from the old host, or a combination of pre-copy and post-copy migration. On the one hand, a typical disadvantage of pre-copy migration is that pre-copy migration chases a moving target, and the same memory page may require transmission multiple times as it is updated during the transmission phase. In a sufficiently quickly executing system, the updates to the state of the guest on the old host may well out-pace the transmission rate of the state to the new host. On the other hand, post-copy migration typically requires freezing execution of the guest on the old host to lock down a set of core memory pages to transfer to the new host, so that those pages may first be transferred to the new host, allowing the guest to be launched on the new host. Post-copy migration may also typically result in page faults on the new host when a given page requested by the guest has yet to be transferred and the page must then be located and retrieved from the previous host. Therefore, pre-copy migration typically incurs a significant network load overhead, while post-copy migration typically incurs a significant overhead in the form of waiting time as pages are migrated and/or retrieved. In either scenario, a large amount of the memory pages associated with a migrating guest (e.g., all allocated but unused pages) may typically be compressed and transferred quickly and efficiently to the new host. These pages typically compress very well since they typically store one long chain of zeroes.

Where the guest being migrated is encrypted, a further challenge is presented since the hypervisors handling the migration may be unable to verify the contents of unmodified pages causing every page of memory associated with a guest to appear to require transmission. This is compounded by the fact that encrypted volumes typically do not compress well with lossless compression techniques since these volumes lack the repetitious qualities of unencrypted unused memory pages (e.g., all zeros). Lossy compression techniques are unsuitable because any loss in data would cause the data to be unable to be decrypted. For guests with large amounts of allocated memory, transmitting every allocated page of memory without compression, whether or not that page has data written to it may incur significant wasted latency.

The present disclosure aims to address the above discussed issues including the security issues faced with deploying encrypted guests on public hosted environments as well as the migration latency issues faced by encrypted guests. In an example, booting up an encrypted guest in a secure environment and then migrating the already instantiated guest to a public multi-tenant cloud may alleviate potential security concerns associated with directly instantiating the encrypted guest on the public cloud, for example, the public cloud hypervisor or host operating system supervisor having access to the encrypted guest's encryption key. However, especially for larger guests with a lot of allocated memory, migrating a large amount of encrypted memory pages that do not compress may greatly reduce the advantageous deployment flexibility, geographical flexibility, and scalability offered by using public cloud hosting services for ramping up computing capacity. In these examples, the encrypted guest may typically be migrated shortly after the encrypted guest boots up in the secure environment, where the vast majority of the encrypted guest's memory pages have yet to be modified. Therefore, by tracking precisely which memory pages an encrypted guest modifies, starting from when a boot sequence for the encrypted guest is first started, a list of the memory pages that actually need transferring may be compiled. While the encrypted guest is booting, the destination host and hypervisor for the encrypted guest may be notified to allocate memory for the new guest. After the encrypted guest boots up, the guest may be suspended by the source hypervisor to prevent additional memory changes while the modified pages are transferred to a destination host. Instead of waiting for all pages to be transferred prior to signaling the destination host that migration is complete, a transfer complete notification may be sent after only the tracked pages are migrated. The destination host may then be configured to consider all of the allocated pages that were not overwritten by transferred tracked pages as being fully transferred pages. Therefore, only relatively few pages are actually transferred to instantiate an encrypted guest on a less secure environment (e.g., a public cloud). By launching encrypted guests in secure environments, and then performing optimized migrations of these guests to avoid transferring unmodified memory pages, secure services may leverage cloud hosting to be quickly scaled up and deployed around the world.

FIG. 1 is a block diagram of a virtualized system configured for efficient instantiation of encrypted guests according to an example of the present disclosure. The system 100 may include one or more host nodes 110A and 110B, separated by a network 105. Host nodes 110A-B may in turn include one or more physical processor(s) (e.g., CPU 112A-C) communicatively coupled to memory device(s) (e.g., MD 114A-B) and input/output device(s) (e.g., I/O 116A-B). As used herein, physical processor or processors 112A-C refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, memory devices 114A-B refer to volatile or non-volatile memory devices, such as RAM, ROM, EEPROM, or any other device capable of storing data. As discussed herein, I/O device(s) 116A-B refer to devices capable of providing an interface between one or more processor pins and an external device, the operation of which is based on the processor inputting and/or outputting binary data. CPU(s) 112A-C may be interconnected using a variety of techniques, ranging from a point-to-point processor interconnect, to a system area network, such as an Ethernet-based network. Local connections within host node 110A, including the connections between CPU 112A and a memory device 114A and between processor 112A and I/O device 116A may be provided by one or more local buses of suitable architecture, for example, peripheral component interconnect (PCI).

In an example, host node 110A may host one or more guests, for example, VM 122 and/or additional VMs and/or containers. In an example, any of may be a container using any form of operating system level virtualization, for example, Red Hat® OpenShift®, Docker® containers, chroot, Linux®-VServer, FreeB SD® Jails, HP-UX® Containers (SRP), VMware ThinApp®, etc. Containers may run directly on a host operating system or run within another layer of virtualization, for example, in a virtual machine. In an example, containers that perform a unified function may be grouped together in a container cluster that may be deployed together (e.g., in a Kubernetes® pod). In an example, a given service may require the deployment of multiple containers and/or pods in multiple physical locations. In an example, VM 122 may be a VM executing on host node 110A. In an example, a container may execute on VM 122. In addition, containers and/or VMs may further host other guests necessary to execute their configured roles (e.g., a nested hypervisor or nested containers). For example, a VM (e.g., VM 122) and/or a container may further host a Java® Virtual Machine ("JVM") if execution of Java® code is necessary.

System 100 may run one or more VMs (e.g., VM 122), by executing a software layer (e.g., hypervisor 120A) above the hardware and below the VM 122, as schematically shown in FIG. 1. In an example, the hypervisor 120A may be a component of respective host operating system 118A executed on host node 110A. In another example, the hypervisor 120A may be provided by an application running on host operating system 118A. In an example, hypervisor 120A may run directly on host node 110A without an operating system beneath hypervisor 120A. Hypervisor 120A may virtualize the physical layer, including processors, memory, and I/O devices, and present this virtualization to VM 122 as devices, including virtual central processing unit ("VCPU") 190A, virtual memory devices ("VMD") 192A, virtual input/output ("VI/O") device 194A, and/or guest memory 195A. In an example, a container may execute directly on host OSs 118 without an intervening layer of virtualization. In an example, a physical I/O device (e.g., I/O 116A) may be virtualized to provide the functionality of the physical device to a virtual guest. In an example, a VM 122 may be a virtual machine and may execute a guest operating system 196A which may utilize the underlying VCPU 190A, VMD 192A, and VI/O 194A. Processor virtualization may be implemented by the hypervisor 120A scheduling time slots on physical processors 112A such that from the guest operating system's perspective those time slots are scheduled on a virtual processor 190A.

VM 122 may run on any type of dependent, independent, compatible, and/or incompatible applications on the underlying hardware and host operating system 118A. In an example, a container or application running on VM 122 may be dependent on the underlying hardware and/or host operating system 118A. In another example, a container or application running on VM 122 may be independent of the underlying hardware and/or host operating system 118A. In an example, a container or application running on VM 122 may be compatible with the underlying hardware and/or host operating system 118A. Additionally, a container or application running on VM 122 may be incompatible with the underlying hardware and/or OS. The hypervisor 120A may manage memory for the host operating system 118A as well as memory allocated to the VM 122 and guest operating system 196A such as guest memory 195A provided to guest OS 196A.

In an example, any form of suitable network 105 for enabling communications between computing devices, for example, a public network (e.g., the Internet), a private network (e.g., a local area network (LAN) or wide area network (WAN)), or a combination thereof may be employed to connect host node 110A, and/or VM 122 to other computer systems, for example, host node 110B and VM 124. In an example, memory device 114B, processors 112B-C, and I/O 116B on host node 110B may provide substantially similar functionality to the equivalent components in host node 110A (e.g., processor 112A, memory device 114A, I/O 116A). In the example, a host OS 118B and hypervisor 120B execute on host node 110B, providing a platform on which VM 124 is hosted. In the example, hypervisor 120B provides VM 124 with virtualized access to memory device 114B, processors 112B-C, and I/O 116B on host node 110B in the form of VCPU 190B, VMD 192B, VI/O 194B and guest memory 195B, with guest OS 196B executing on VM 124 in a supervisory role. In an example, scheduler 140 may be a program that manages the deployment of virtual processing nodes (e.g., VMs 122 and 124) to host nodes 110A-B. Scheduler 140 may be implemented with any suitable form of computer application, program, service, or executable code. In some examples, scheduler 140 may be implemented as a component part of a guest scheduling and computing orchestration service (e.g., Red Hat® OpenShift®, Kubernetes®).

In an example, illustrated system 100 may depict multiple nodes within one hosted environment (e.g., a multi-tenant cloud) on which compute resources may be deployed. In another example, host node 110A may be located in one cloud environment or data center, while host node 110B may be located in a separate cloud environment or data center within the same cloud environment. In either example, VM 122 may be a source VM that is migrated from host node 110A to host node 110B where VM 122 continues execution as VM 124 or vice versa. In an example, system 100, including host nodes 110A-B, are in a private, secured hosting environment (e.g., belonging to a company's intranet), where the company scales up compute deployment by procuring additional compute resources from public multi-tenant cloud providers.

Figure 2:
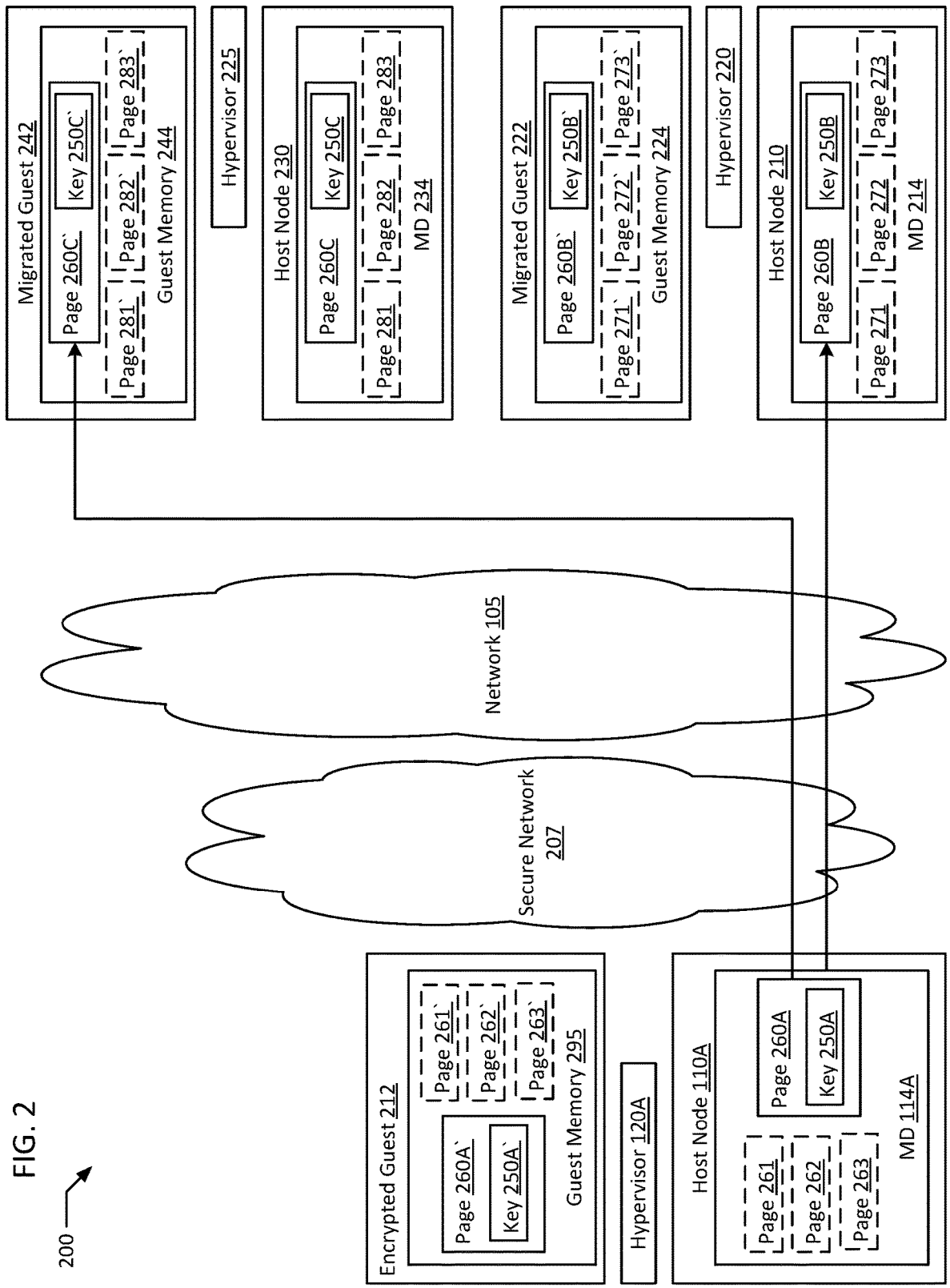
FIG. 2 is a block diagram illustrating a system implementing efficient instantiation of encrypted guests to deploy encrypted guests to different hosting environments according to an example of the present disclosure.

FIG. 2 is a block diagram illustrating a system implementing efficient instantiation of encrypted guests to deploy encrypted guests to different hosting environments according to an example of the present disclosure. In an example, system 200 illustrates a version of system 100 where additional compute capacity is required outside of a secured zone (e.g., deployment outside of a secure network 207). In the example, host node 110A is located inside of secure network 207. In an example, secure network 207 may be a similar network to network 105, however, devices within secure network 207 may be isolated from public networks (e.g., the Internet), by a layer of devices operating as a firewall. In an example, a layer of devices (e.g., routers, switches, servers) constituting a "de-militarized zone" ("DMZ") may isolate secure network 207 from directly interfacing with network 105. In an example, guests deployed onto public cloud hosts (e.g., host node 210 or 230) may be deployed as encrypted guests (e.g., encrypted guest 212) to prevent unauthorized access to data, especially in the public cloud environments. In an example, an encrypted guest 212 is first instantiated on host node 110A in the secure environment inside secure network 207. In the example, encrypted guest 212 is encrypted with any suitable form of encryption (e.g., full memory encryption, private key encryption, etc.). In an example, an encryption key (e.g., key 250A) is generated by host node 110A and/or hypervisor 120A to encrypt encrypted guest 212. As used herein, an encryption key may be referred to as a "key" for brevity. In some examples, encryption key 250A is stored in a page of memory (e.g., page 260A) allocated to encrypted guest 212. In other examples, key 250A may be stored outside of the memory space of encrypted guest 212, for example, in hypervisor memory for hypervisor 120A or in a CPU register on host node 110A. In an example, key 250A may be transferred to target hosts to allow the migrated host to be decrypted (e.g., as copies stored as key 250B, 250C).

In an example, encrypted guest 212 is launched in response to a request to scale up compute power associated with the processing tasks performed by copies of encrypted guest 212. In the example, the request may be a request to deploy a copy of encrypted guest 212 to a public cloud environment, for example, due to a lack of capacity within the secure network, or due to performance advantages (e.g., latency advantages from collocating a guest with the clients served by the guest) offered by the flexibility of deploying to cloud hardware. In an example, in response to the request, a requested amount of memory associated with encrypted guest 212's guest memory 295 is allocated in memory device 114A. In some examples, this allocated memory may be further initialized by flagging all of the allocated pages as read only and/or by overwriting all of the allocated pages with zeros. In either case, the allocated memory may be initialized as encrypted memory using key 250A.

In an example, encrypted guest 212 is then instantiated on host node 110A with the allocated memory, at least until encrypted guest 212 is fully booted and independently executing. In the example, each page in the allocated memory that is modified by the boot process is tracked. For example, where the allocated memory is set to read only, each page that is accessed triggers a memory fault, after which hypervisor 120A sets the respective page (e.g., page 260A storing key 250A) to read/write to allow the page to be modified. In some examples, page tracking may be performed in a tracking file, and pages may be reset to read only after changes occur to track subsequent changes. In examples where encrypted guest 212 is migrated substantially immediately after being booted without beginning to execute any data processing services, tracking may be performed simply by leaving pages as read/write, since each read/write page is a modified page that needs to be migrated. In an example, each page of memory depicted in FIG. 2 in memory devices 114A, 214, and 234 (e.g., pages 260A-C, 261-263, 271-273, and 281-283) is associated with a respective virtual memory page of the guests hosted on the host nodes 110A, 210, and 230 (e.g., encrypted guest 212, migrated guests 222, 242). In an example, each of pages 260A-C, 261-263, 271-273, and 281-283 corresponds to a respective virtual memory page depicted as pages 260A'-C', 261'-263',271'-273', and 281'-283' respectively. In the example, memory pages 260A, 261, 262, and 263 are virtual memory pages of encrypted guest 212, depicted as memory pages 260A', 261', 262', and 263'. In the example, page 260A and page 260A' are modified by encrypted guest 212's boot process while pages 261-263 remain unmodified during the boot process.

In an example, while encrypted guest 212 is booting up, hypervisor 120A, scheduler 140, and/or host node 110A notifies host node 210 and/or host node 230 to begin allocating memory in preparation for receiving a migrated encrypted guest 212. In the example, host node 210 begins allocating the requested amount of memory. In some examples the allocated memory on host node 210 in memory device 214 is also initialized by being zeroed (e.g., by overwriting all of the initialized memory locations with zero). In an example, tracked changed pages on host node 110A (e.g., page 260A) are transferred to host node 210. These tracked pages may be transferred as they are modified or in a consolidated transfer after encrypted guest 212 finishes booting up. For example, if encrypted guest 212 is finished booting, execution of encrypted guest 212 may be paused, and the tracked pages may be compressed together for a more efficient transfer. In many examples, compressing encrypted pages may only result in marginal gains since compression may well take more time than the reduced network bandwidth used saves. In another example, tracked pages may be tracked continuously for updates and transfers may be made continuously during the boot process reducing the total guest instantiation latency on cloud host node 210. In such examples, modified and transferred pages may be set to read only on host node 110A to track further updates to those pages after they have already been transferred (e.g., via triggered memory faults). In an example, after all of the modified pages of encrypted guest 212 are transferred (e.g., page 260A), including the relevant encryption key (e.g., key 250A/250A') used to encrypt guest memory 295, a confirmation message may be sent to host node 210 that transfer has been completed. In such an example, the resulting migrated guest 222 is ready to continue execution without providing hypervisor 220 access to encryption key 250B (e.g., the received copy of key 250A received with page 260A saved as page 260B) since only the CPU of host node 210 needs access to key 250B to allow the already booted migrated guest 222 to continue executing. In the example, non-modified pages 261-263 are not transferred, but rather upon receiving notice that modified pages (e.g., page 260A) of migrated guest 212 have been transferred as page 260B to host node 210, hypervisor 220 and/or a memory management unit of host node 210 may be configured to substituted allocated pages 271, 272, and 273 which have been initialized as empty, zeroed pages for the non-transferred pages 261-263. In an example, migrated guest 222's guest memory 224 comprises the allocated memory pages on memory device 214 (e.g., pages 260B', 271'-273' corresponding to pages 260B, 271-273). In the example, key 250B may be stored in a modified and transferred page of guest memory from encrypted guest 212 (e.g., page 260A storing key 250A transferred as page 260B storing key 250B). In other examples, key 250B may be transferred separately to host node 210 (e.g., as part of metadata associated with encrypted guest 212).

In an example, host node 230 may be a host in a different public cloud and/or different data center from host node 210. In such an example, there may be limited security risk in reusing the same encryption key between these two hosting environments, and therefore for efficiency, the same encrypted guest 212 may additionally be deployed to host node 230. In an example, the suspended encrypted guest 212 may be additionally transferred multiple times to different hosting environments by requesting the additional environments to prepare enough memory to host encrypted guest 212 by allocating the memory locally (e.g., in memory device 234 on host node 230 as guest memory 244 with pages 260C, 281, 282, and 283). In the example, after modified page 260A along with key 250A are transferred to host node 230 and saved as page 260C and key 250C, a second copy of encrypted guest 212 may resume execution as migrated guest 242 with guest memory 244. In the example, since migrated guest 242 is also already booted, hypervisor 225 need not be able to read the unencrypted contents of guest memory 244, and therefore hypervisor 225 does not require access to key 250C.

In these examples, without pre-initialization of the target memory (e.g., in memory device 214 and/or 234) and the tracking of the pages modified during the boot process of encrypted guest 212 (e.g., page 260A), the entire memory space of encrypted guest 212 may need to be transferred in order to ensure uninterrupted execution on destination hosts 210 and/or 230. For example, because hypervisors 220 and/or 225 are unable to directly access the contents of the encrypted but unmodified memory pages 271-273 and/or 281-283, without being able to send a confirmation that transfer is complete after modified page 260A is transferred, an attempt by migrated guest 222 to modify an empty page (e.g., page 271) may result in a memory fault that causes hypervisor 220 to attempt to retrieve the contents of corresponding page 261 from host node 110A. Even though page 261 is blank, due to the encryption, hypervisor 220 would be unable to determine that page 261 and 271 are blank therefore necessitating potentially large amounts of wasted network latency and bandwidth, especially because encrypted memory typically does not compress well even if it is not storing any actual data. In many instances, only a very small amount of the total memory space of an encrypted guest (e.g., encrypted guest 212) is modified by the boot process of the guest, with the vast majority of the allocated memory space being reserved for storing stateful data for down stream processing. Therefore, a large amount of unnecessary wasted networking and storage I/O overhead may be avoided via efficient instantiation of encrypted guests. These guests may also be instantiated significantly faster on an unsecured public hosting environment while still preventing potential access to the data contents of the guests by other guests on the same host via some form of elevated access exploit associated with the host's hypervisor (e.g., hypervisor 220 of host node 210 being exploited by another guest from a different tenant sharing the host). Therefore, efficient instantiation of encrypted guests advantageously allows for reduced exposure to security risks while also reducing deployment latency of encrypted guests to enable encrypted guests to be launched with sufficiently low latency to handle rapid scaling of compute resources across a network.

FIGS. 3A-D are block diagrams illustrating a system performing an efficient instantiation of encrypted guests workflow according to an example of the present disclosure. In an example, system 300 illustrated in FIG. 3A depicts a workflow by which a guest is instantiated on one host (e.g., host node 110A) and then migrated to a different host (e.g., host node 210) without transferring the entire memory space of the guest from source to destination. In an example, a guest instantiation request 340 is received by hypervisor 120A of host node 110A. For example, a scheduler 140 may be responsible to deploying additional compute capacity for an application or service as necessitated by usage. In the example, scheduler 140 may have access to hosts in a secure environment (e.g., host node 110A and/or host node 110B) as well as access to one or more public cloud hosting environments (e.g., host nodes 210 and 230). In the example, scheduler 140 may begin instantiation of a new guest in a public cloud host by requesting the hypervisor of a secure host (e.g., hypervisor 120A) to allocate and initialize a memory space (e.g., guest memory 295) on host node 110A. Substantially simultaneously with (or at any point after) hypervisor 120A starting to initialize guest memory 295 (e.g., pages 260A, 261-263), a memory provisioning request 345 is sent to a destination host (e.g., host node 210 in a public cloud) for a substantially equivalent amount of memory to be provisioned. For example, hypervisor 220 on host node 210 is notified to provision memory for the transferred guest that will execute on host node 210 in the form of pages 260B, 271, 272, and 273. In some examples, the exact amount of memory provisioned on source and destination may differ, for example, due to different page size and/or block size settings between memory devices 114A and 214. In an example, the initialized pages on both source and destination are initially flagged as read only (e.g., RO 360A-B, 361, 362, 363, 371, 372, and 373). In an example, these memory pages may additionally have any existing data (e.g., data still present after the respective memory pages were deallocated from a previous use) overwritten (e.g., with all zeroes).

System 301 depicted in FIG. 3B depicts system 301, which is a later execution state of system 300, where an encrypted guest 212 is booted on source host node 110A. In the example, during the boot process of encrypted guest 212, the allocated memory pages (e.g., guest memory 295) are encrypted with encryption key 250A by hypervisor 120A and/or CPU 112A. In the example, encryption key 250A is stored in guest memory 295 in memory page 260A/260A'. Therefore, memory page 260A/260A' is modified to store key 250A. However since page 260A is flagged as read only 360A, a memory fault is triggered to hypervisor 120A, and hypervisor 120A, after validating access credentials, updates page 260A to read/write state 370A. In an example, by being flagged as read/write state 370A, page 260A becomes flagged for transfer to destination host 210, and is transferred to destination host 210 as page 260B, which includes a copy of encryption key 250B. In an example, since encryption key 250B is stored in encrypted page 260B, hypervisor 220 lacks direct access to encryption key 250B and therefore hypervisor 220 also lacks direct access to the contents of page 260B. For example, a processor on host 210 may be configured to store key 250B directly in its CPU register and to encrypt and decrypt memory pages without passing the unencrypted data through the hypervisor. In an example, the transferred copy of page 260B may be reset to read only state 360C prior to migrated guest 222 beginning execution and potentially modifying page 260B to allow hypervisor 220 to manage access to page 260B.

System 302 illustrated in FIG. 3C depicts system 302, which is system 301 after encrypted guest 212 finishes booting up. In an example, after encrypted guest 212 boots, hypervisor 120A suspends or pauses execution of encrypted guest 212. In the example, hypervisor 120A then analyzes guest memory 295 of encrypted guest 212 for all of the pages modified by the boot process of encrypted guest 212. Upon determining that all of the modified pages of encrypted guest 212 have been transferred to host node 210, a transfer confirmation 347 is sent to host node 210 (e.g., to hypervisor 220). In the example, even though hypervisor 220 lacks access to the contents of the transferred pages (e.g., page 260B), hypervisor 220 may, based on transfer confirmation 347 resume execution of transferred encrypted guest 212 on host node 210. In the example, pages 271, 272, and 272 allocated and initialized locally on host node 210 are substituted for pages 261-263 which are not transferred based on being unmodified.

System 303 illustrated in FIG. 3D depicts system 303, which is system 302 after encrypted guest 212 is fully migrated. In an example, guest memory 295 may be deprecated and its storage reclaimed after encrypted guest 212 is successfully migrated. In another example, encrypted guest 212 may remain in suspension to be launched on other hosts (e.g., host node 230). In an example, migrated guest 222 is a copy of encrypted guest 212. In the example, guest memory 224 of migrated guest 222 is a virtual representation of the memory pages allocated by host node 210 for receiving encrypted guest 212 (e.g., pages 260B, 271, 272, 273), where the pages modified during encrypted guest 212's boot process (e.g., page 260A) are transferred to host node 210 to overwrite the corresponding page 260B on host node 210. In an example, as migrated guest 222 executes, it may access locally initialized pages 271-273 to store new data.

Figure 4:
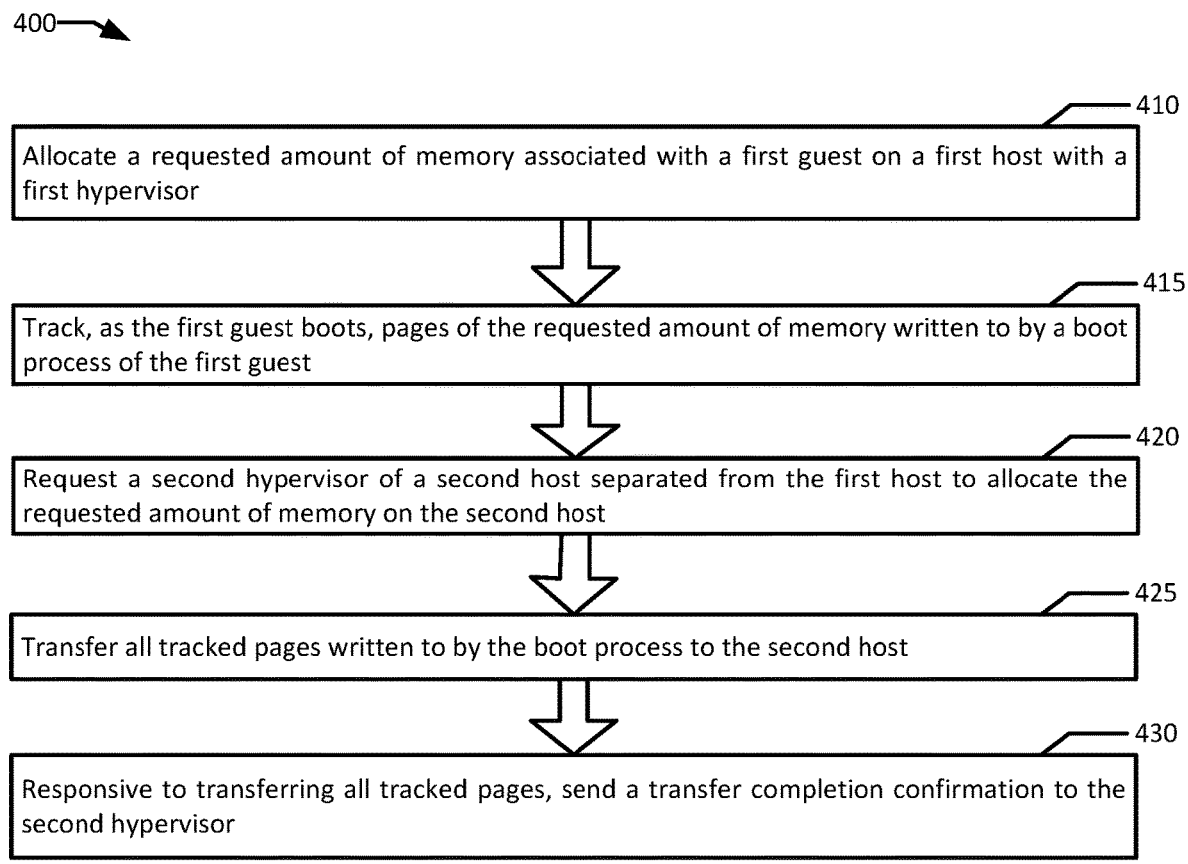
FIG. 4 is a flowchart illustrating an example of efficient instantiation of encrypted guests by a cloud tenant according to an example of the present disclosure.

FIG. 4 is a flowchart illustrating an example of efficient instantiation of encrypted guests by a cloud tenant according to an example of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both. In an example, the method 400 is performed by a hypervisor 120A in conjunction with a hypervisor 220.

Example method 400 may begin with allocating a requested amount of memory associated with a first guest on a first host with a first hypervisor (block 410). In an example, a memory space of encrypted guest 212 (e.g., guest memory 295 with pages 260A, 261, 262, 263) is allocated on host node 110A. In the example, page 260K is a virtual representation of page 260A stored in memory device 114A. In an example, when guest memory 295 is requested, it is requested to be of a certain minimum size, and the amount of requested memory for guest memory 295 is initialized in memory device 114A by having each page of memory allocated for the request flagged as read only. In an example, the requested memory is further zeroed to clear all previous contents of the requested memory. In various examples, zeroing the requested memory may be unnecessary. It should be well understood that even though clearing data from memory by overwriting the memory with zeros is customary, a similar result would be achieved by overwriting the data with all ones, or any pattern, pseudorandom sequence, or random sequence of zeroes and ones, and therefore any of these techniques would be effectively equivalent to zeroing the requested memory. In addition, in some examples, if the requested pages have not been used since memory device 114A was initialized, the requested pages would already be zeroed. In another example, for example, a lower security example, deallocated pages may be flagged to read only without removing the previous contents of the pages, and the pages may be overwritten only after each respective page is accessed by encrypted guest 212. In such examples, tracking pages for transfer based on read only vs. read/write state would still be viable since the read only (but not overwritten pages) would not be transferred, and therefore stale data would not be leaked.

As the first guest boots, pages of the requested amount of memory written to by a boot process of the first guest are tracked (block 415). In various examples, hypervisor 120A and/or host node 110A may employ various methods for tracking whether a given memory page allocated to guest memory 295 has been modified. For example, a bitmap may be maintained of the dirty status (e.g., modified) or clean status (e.g., unmodified) of each page of memory allocated to guest memory 295 (e.g., pages 260A, 261-263). In examples where efficient instantiation of encrypted guests is employed primarily to instantiate new encrypted guests on remote systems, tracking may be performed directly with the access permissions on a given memory page without an additional tracking file. For example, each clean page that is unmodified may be in a read only state (e.g., pages 261-263 in read only states 361-363) while a modified page (e.g., page 260A) may be converted to a read/write state (e.g., read write 370A). For example, each time a read only page is accessed (e.g., page 260A set to read only state 360A), hypervisor 120A may evaluate the accessor's credentials for accessing the memory page, and if allowed to do so, change the access credential setting from read only (e.g., read only 360A) to read/write (e.g., read/write 370A). In an example, hypervisor 120A performs this evaluation based on a memory fault triggered by an attempt to modify a page set to read only. In an example, if transfer of tracked pages begins after encrypted guest 212 is fully booted and execution is paused, tracking of modified pages may be based purely on whether a page is set to a read only state or a read/write state, since every modified page (regardless of how many times it has been modified) will be flagged as read/write.

In an example, for extra security, guest memory 295 may be encrypted before encrypted guest 212 boots up, therefor allowing not just data files to be encrypted but also the system files of encrypted guest 212, as compared for example, to encrypting a persistent storage volume mounted to a non-encrypted guest. In such examples, an encryption key (e.g., key 250A) utilized to encrypt guest memory 295 may be generated by hypervisor 120A, and/or CPU 112A of host node 110A. In the example, the encryption key 250A may be stored in guest memory 295 allocated for encrypted guest 212, for example, in page 260A. In other examples, key 250A may be stored in any data file or other data store associated with encrypted guest 212 flagged for transfer to target hosts (e.g., in metadata associated with encrypted guest 212).

A second hypervisor of a second host separated from the first host by a network is requested to allocate the requested amount of memory on the second host (block 420). In an example, the same, or slightly more depending, for example, on page size settings, amount of memory allocated on memory device 114A for guest memory 295 may be requested to be allocated on target host node 210. In an example, hypervisor 220 of target host node 210 may be restricted from accessing encryption key 250A (transferred to host node 210 as encryption key 250B) to prevent malicious users from gaining access to the data contents of migrated guest 222 via hypervisor 220. In an example, memory that will eventually become guest memory 224 of migrated guest 222 is allocated by hypervisor 220 to prepare for receiving encrypted guest 212.

All tracked pages written to by the boot process are transferred to the second host (block 425). In an example, each page modified during the boot process of encrypted guest 212 (e.g., page 260A) is transferred to target host node 210 (e.g., as page 260B) with contents intact. In some examples, encrypted guest 212's execution may be paused or suspended before hypervisor 120A transferring tracked page 260A (e.g., based on being set to read/write state 370A) to target host node 210.

In response to transferring all tracked pages, a transfer completion confirmation is sent to the second hypervisor (block 430). In an example, a second guest that is a migrated copy of the first guest is instantiated on the second host with the transferred pages from the first guest. In an example, after each tracked page is transferred (e.g., page 260A), hypervisor 220 and/or host node 210 is informed that transfer is complete. In an example, based on this confirmation of a completed transfer, guest memory 224 may be instantiated based on the transferred pages (e.g., page 260A) and locally instantiated blank pages (e.g., pages 271-273). In such an example, hypervisor 220 may be configured to interpret an access request by migrated guest 222 to a locally instantiated blank page (e.g., page 271) as an attempt to allocate blank memory, thereby avoiding querying hypervisor 120A to confirm that page 261 does not need to be transferred. Therefore, transfer and migration of a guest may be completed without inclusively accounting for each page allocated to the transferred guest, based on configuring the system to interpret each page is clean/unmodified unless flagged as dirty/modified, instead of being configured to interpret each page as dirty/modified unless verified to be clean/unmodified.

Figure 5:
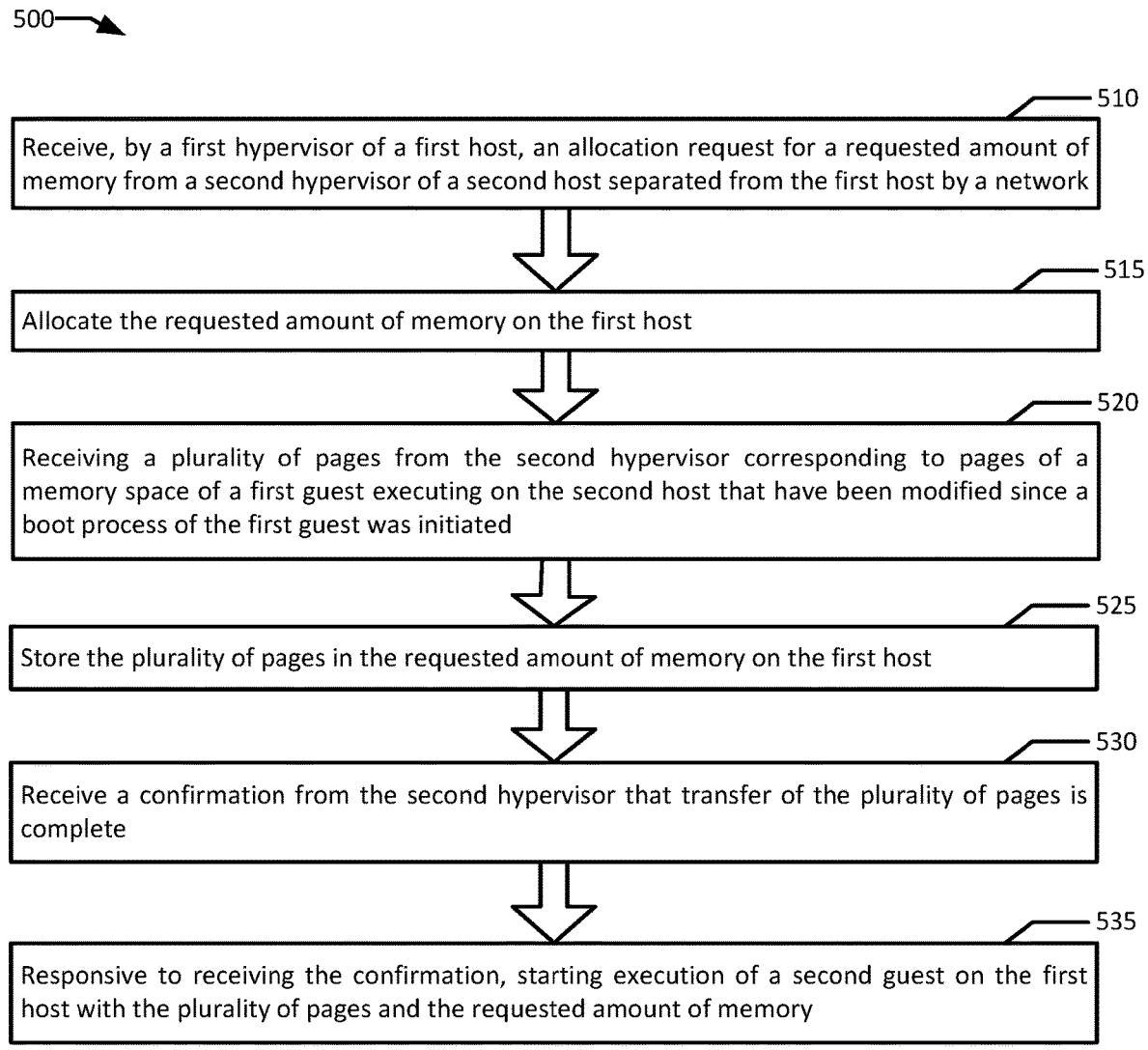
FIG. 5 is a flowchart illustrating an example of efficient instantiation of encrypted guests by a cloud provider according to an example of the present disclosure.

FIG. 5 is a flowchart illustrating an example of efficient instantiation of encrypted guests by a cloud provider according to an example of the present disclosure. Although the examples below are described with reference to the flowchart illustrated in FIG. 5, it will be appreciated that many other methods of performing the acts associated with FIG. 5 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 500, a hypervisor 220 in conjunction with a hypervisor 120A.

In example system 500, a first hypervisor of a first host receives an allocation request for a requested amount of memory from a second hypervisor of a second host separated from the first host by a network (block 510). In an example, hypervisor 220 receives memory provisioning request 345 from hypervisor 120A for a memory space of guest memory 224. The requested amount of memory is allocated on the first host (block 515). In the example, pages 260B, 271, 272, and 273 are allocated by hypervisor 220 based on memory provisioning request 345. In an example, the requested amount of memory (e.g., pages 260B, 271-273) is initialized, including by zeroing all memory addresses in the requested amount of memory. In an example, guest memory 295 of encrypted guest 212 is encrypted on host node 110A with encryption key 250A stored in guest memory 295 (e.g., key 250A on page 260A). In an example, hypervisor 220 is restricted and/or prohibited from accessing key 250A for security reasons (e.g., due to being a hypervisor shared with other tenants of host node 210). In an example, encryption key 250A is transferred to host node 210 as key 250B, and migrated guest 222 (e.g., associated guest memory 224) is encrypted with key 250B when migrated guest 222 begins execution on host node 210.

A plurality of pages are received from the second hypervisor corresponding to pages of a memory space of a first guest executing on the second host that have been modified since a boot process of the first guest was initiated (block 520). In an example, pages modified by encrypted guest 212 on host node 110A as encrypted guest 212's boot process is executed, including page 260A, are received by hypervisor 220. In an example, each page of the plurality of pages, including page 260A is in a read-write state (e.g., read/write state 370A) on the second host node 110A. The plurality of pages is stored in the requested amount of memory on the first host (block 525). In an example, the transferred pages including page 260A are stored in the allocated memory on host node 210 (e.g., the contents of page 260A overwriting page 260B).

A confirmation is received from the second hypervisor that transfer of the plurality of pages is complete (block 530). In an example, after the tracked and modified pages are transferred by host node 110A, hypervisor 120A sends transfer confirmation notice 347 to hypervisor 220, indicating that the transfer of modified pages is complete, which indicates to hypervisor 220 that migrated guest 222 is ready to be launched. In an example, transfer confirmation 347 may include a manifest of the transferred plurality of pages to allow hypervisor 220 to validate that all of the transferred pages have been received, and that the transfer was successful. In an example, an identifier of each transferred page and/or a checksum or other digital signature of each page may be included in such manifest. In response to receiving the confirmation, execution of a second guest on the first host is started with the plurality of pages and the requested amount of memory (block 535). In an example, migrated guest 222 is launched before each allocated page on host node 210 for guest memory 224 is replaced with a page from source host node 110A. In the example, hypervisor 120A sends transfer confirmation 347 even though pages 261-263, which are also pages of guest memory 295, the memory space of encrypted guest 212, have not been transferred. For example, based on identifying that pages 261-263 are flagged with read only states 361-363, hypervisor 120A determines that these pages are unmodified and do not require transmission.

Figure 6:
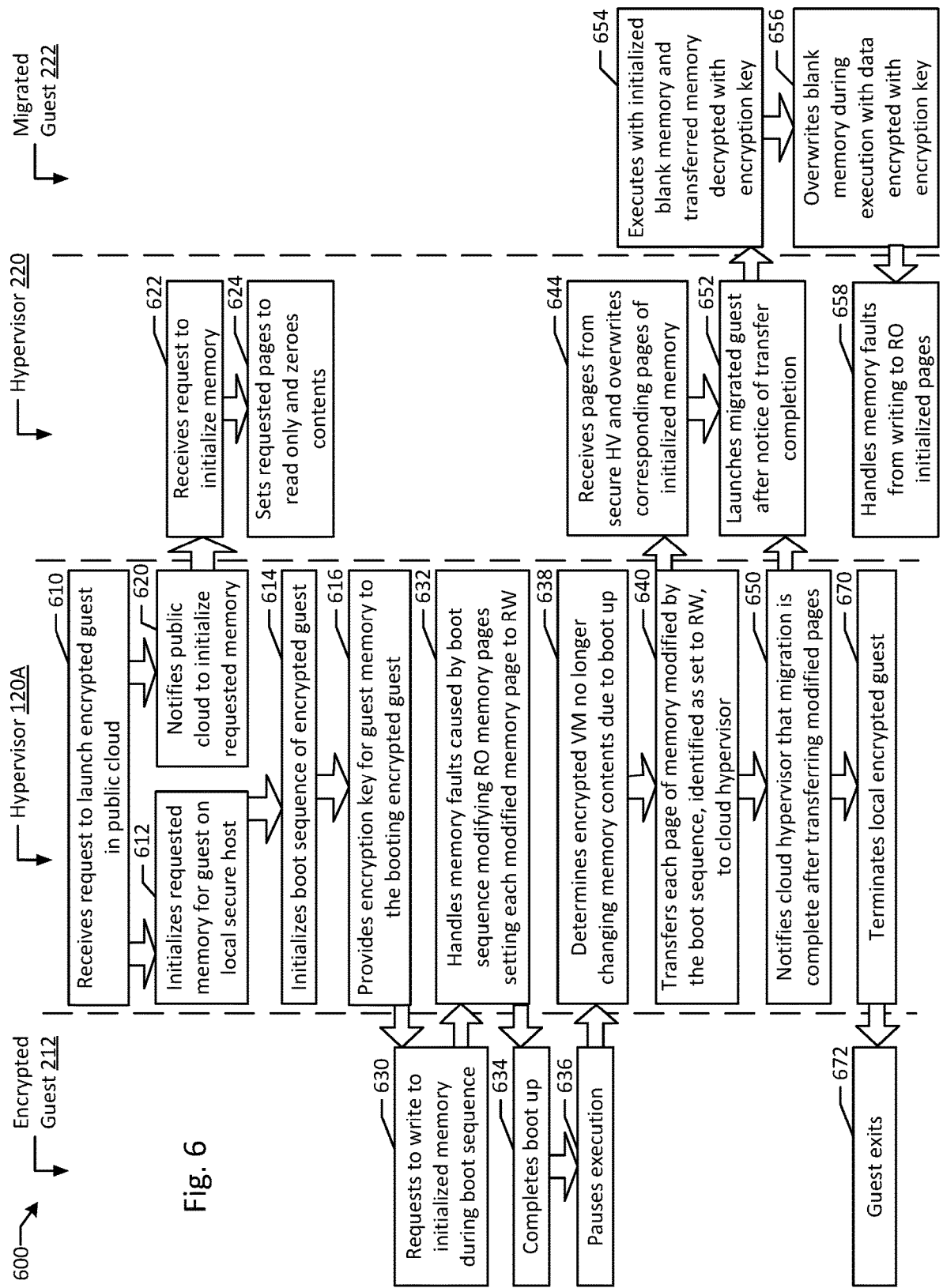
FIG. 6 is flow diagram of an example of efficient instantiation of encrypted guests according to an example of the present disclosure.

FIG. 6 is flow diagram of an example of efficient instantiation of encrypted guests according to an example of the present disclosure. Although the examples below are described with reference to the flowchart illustrated in FIG. 6, it will be appreciated that many other methods of performing the acts associated with FIG. 6 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 600, hypervisor 120A and hypervisor 220 implement efficient instantiation of encrypted guests to deploy encrypted guest 212 as migrated guest 222 to host node 210.

In example system 600, hypervisor 120A receives guest instantiation request 340 to launch an encrypted guest on a public cloud host (block 610). In the example, hypervisor 120A may initiate parallel tracks of processing to expedite the fulfillment of guest instantiation request 340. For example, on secure host node 110A behind secure network 207, hypervisor 120A initializes memory for guest memory 295 of the requested guest (block 612). In addition, hypervisor 120A also sends memory provisioning request 345 to hypervisor 220 out of secure network 207 and over public network 105 to notify public cloud hypervisor 220 to initialize a corresponding amount of memory (block 620).

In an example, on the secure local host node 110A, a boot sequence of encrypted guest 212 is initialized with the allocated guest memory 295 (block 614). In the example, guest memory 295 is first encrypted prior to or during the boot process of encrypted guest 212. For example, hypervisor 120A provides encryption key 250A to the booting encrypted guest 212 (block 616). In an example, hypervisor 220 on the public cloud receives the memory provisioning request 345 (block 622). Hypervisor 220 then requests that the requested memory pages (e.g., pages 260B, 271-273) be set to read only states 360B, 371-373, and that the contents of these memory pages be zeroed (block 624).

In an example, encrypted guest 212 requests to write to a plurality of memory pages in guest memory 295 during its boot sequence (block 630). In the example, hypervisor 120A handles the memory faults arising from these accesses to memory pages initialized as read only (e.g., pages 260A, 261-263 in read only states 360A, 361-363) by modifying these memory pages upon access to a read/write state (e.g., read/write state 370A) and allowing the respective pages (e.g., page 260A) to be modified (block 632). In an example, encrypted guest 212 completes booting up (block 634). After bootup is complete, encrypted guest 212 pauses execution (block 636). In the example, hypervisor 120A determines that encrypted guest 212 is no longer changing the memory contents of guest memory 295 due to its boot up process (block 638). In some examples, hypervisor 120A may request the pausing and/or suspension of encrypted guest 212, and determine based on this pausing and/or suspension that no further memory changes will be made.

In an example, hypervisor 120A transfers each page of memory modified during the boot sequence of encrypted guest 212 (e.g., page 260A), as identified based on the respective memory page being set to the read/write state (e.g., read/write state 370A) to public cloud hypervisor 220 (block 640). In the example, hypervisor 220 receives the pages (e.g., page 260A as page 260B) from secure hypervisor 120A and overwrites the corresponding pages (e.g., page 260B) in the memory allocated on host node 210 (block 644). In an example, hypervisor 120A sends transfer completion notice 347 to hypervisor 220 to notify hypervisor 220 that transfer of the tracked modified pages (e.g., page 260A) is complete (block 650). In the example, hypervisor 220 launches migrated guest 222 after receiving transfer completion notice 347 (block 652).

In an example, migrated guest 222 executes with guest memory 224 comprising locally initialized blank memory pages 271-273 along with transferred memory page 260B, whose contents are decrypted with migrated guest 222's copy of encryption key 250A (e.g., key 250B) (block 654). In the example, while migrated guest 222 executes, data is written to locally initialized blank memory pages 271-273, and the data is encrypted with key 250B (block 656). In an example, hypervisor 220 handles the resultant memory faults incurred when migrated guest 222 accesses these locally initialized blank memory pages 271-273 flagged with read only states 371-373 (block 658).

In an example, after transfer and/or migration of encrypted guest 212 is complete, hypervisor 120A terminates encrypted guest 212 (block 670). In the example, encrypted guest 212 exits (block 672). In some examples, the memory associated with encrypted guest 212 (e.g., guest memory 295) is reclaimed. In other examples, guest memory 295 may be preserved to allow additional copies of encrypted guest 212 to be deployed (e.g., to host node 230).

Figure 7:
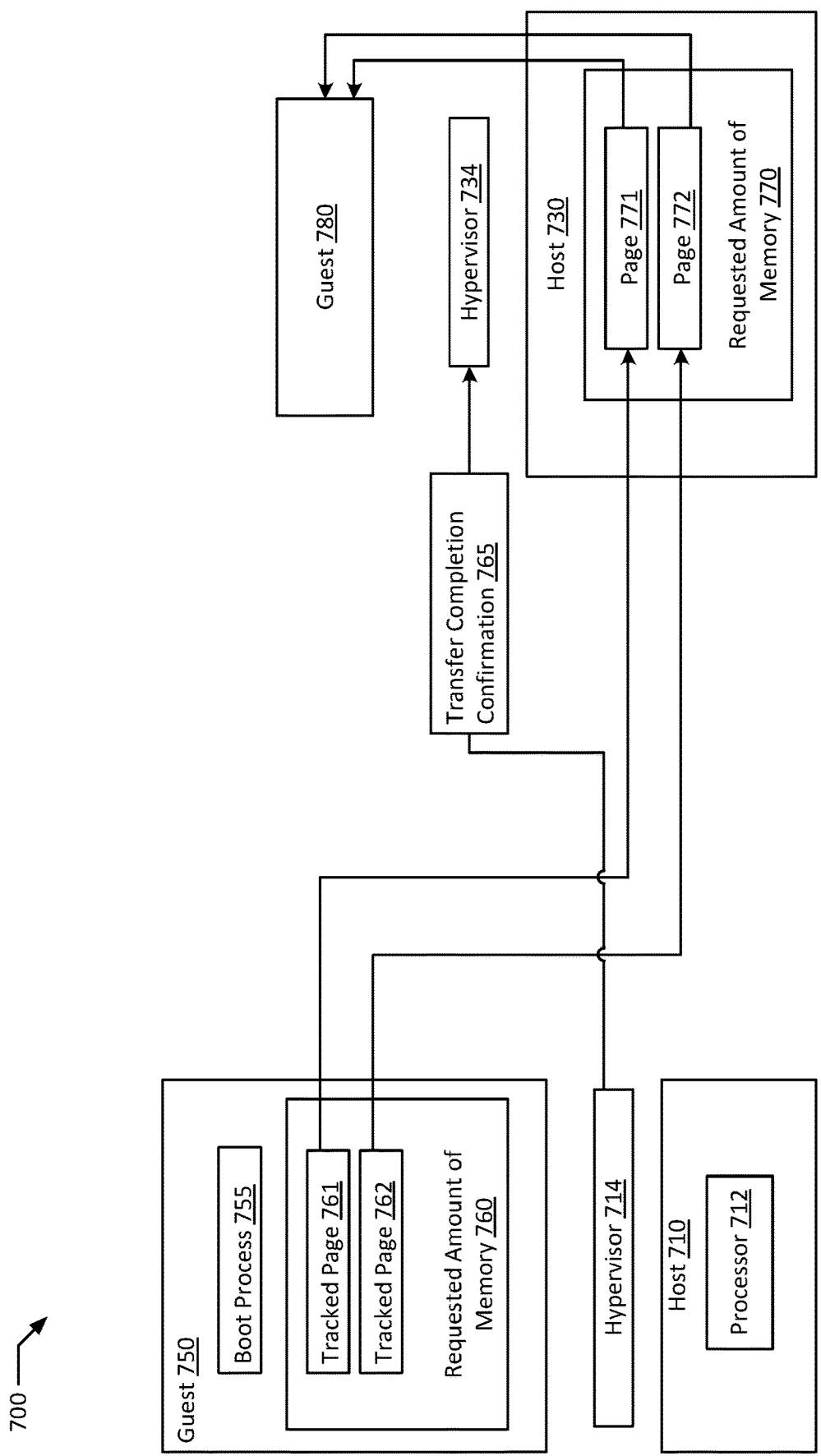
FIG. 7 is a block diagram of an example system of a cloud tenant implementing efficient instantiation of encrypted guests according to an example of the present disclosure.

FIG. 7 is a block diagram of an example system of a cloud tenant implementing efficient instantiation of encrypted guests according to an example of the present disclosure. Example system 700 includes host 710 with processor 712 and hypervisor 714 and host 730 with hypervisor 734 separated from host 710 by network 705, with hypervisor 714 executing on processor 712 to allocate requested amount of memory 760 associated with guest 750 on host 710. As guest 750 boots, tracked pages 761 and 762 written to by boot process 755 of guest 750 are tracked. Hypervisor 734 is requested to allocate requested amount of memory 770 on host 730. Tracked pages 761 and 762 written to by boot process 755 are transferred to host 730 as pages 771 and 772. In response to transferring tracked pages 761 and 762, transfer completion confirmation 765 is sent to hypervisor 734, and guest 780 which is a migrated copy of guest 750 is instantiated on host 730 with transferred pages 771 and 772 from guest 750.

Figure 8:
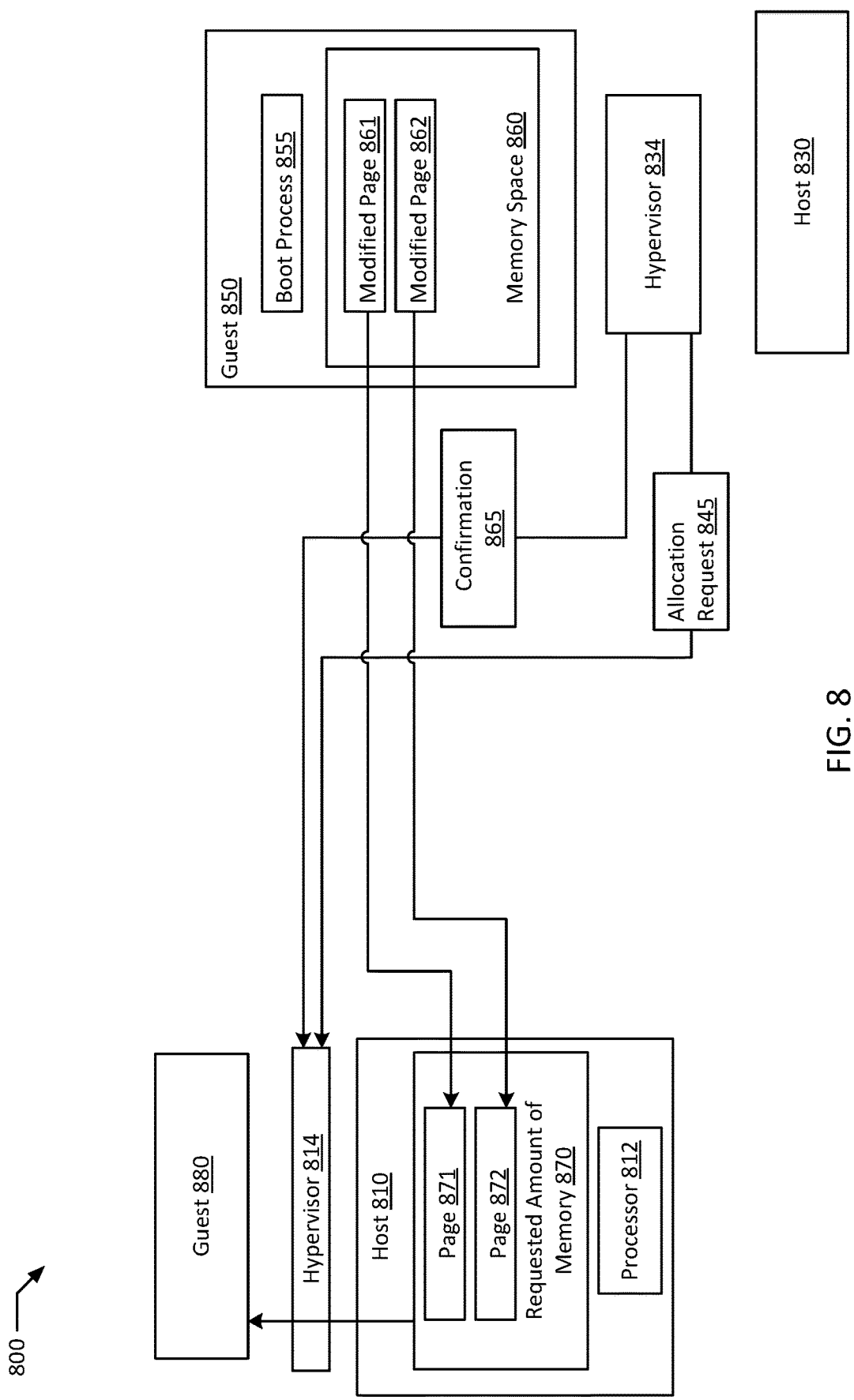
FIG. 8 is a block diagram of an example system of a cloud provider implementing efficient instantiation of encrypted guests according to an example of the present disclosure.

FIG. 8 is a block diagram of an example system of a cloud provider implementing efficient instantiation of encrypted guests according to an example of the present disclosure. Example system 800 includes host 810 with processor 812 and hypervisor 814 and host 830 with hypervisor 834 separated from host 810 by network 805, where hypervisor 814 executes on processor 812 to receive allocation request 845 for requested amount of memory 860 from hypervisor 834. Requested amount of memory 860 is allocated on host 810. Pages 871 and 872 are received from hypervisor 834 corresponding to modified pages 861 and 862 of a memory space 860 of guest 850 executing on host 830 that have been modified since boot process 855 of guest 850 was initiated. Modified pages 861 and 862 are stored as pages 871 and 872 in requested amount of memory 870 on host 810. A confirmation 865 is received from hypervisor 834 that transfer of modified pages 861 and 862 is complete. In response to receiving confirmation 865, execution of guest 880 is started with pages 871 and 872 and requested amount of memory 870.

Efficient instantiation of encrypted guests enables deployment of high security encrypted guests flexibly and quickly on shared infrastructure such as public multi-tenant cloud environments. In multi-tenant environments, allowing a shared hypervisor to have access to guest data presents a security risk, specifically, a route through which data may be leaked to a malicious actor. However, to boot up a new guest, a hypervisor would typically be required to have access to the contents of a guest's memory space in order to oversee the boot process. Therefore, to avoid a shared hypervisor (e.g., in a public cloud) from having access to an encrypted guest's memory space, the encrypted guest may be first booted in a secure environment with a secure, non-shared hypervisor and then the guest may be migrated to the shared environment. Due to encryption scrambling the contents of the guest's memory space, typically in a low repetition pattern that is not easily compressible, migrating an encrypted guest's memory space is a high latency process that typically requires transferring a lot of data for memory that is actually unused. By tracking the actual pages modified by the boot process of a guest, and transferring only those modified pages, a lot of network latency and bandwidth may be saved for migrating an encrypted guest. In addition, typical lazy dirty tracking migration processes generally mark all pages dirty (modified) and then slowly clarify which pages are actually free to ensure that no pages are left behind. However, especially with migrations that occur shortly after guest instantiation, this type of conservative approach typically results in a vast number of false positives with regard to the number of modified pages, resulting in many more pages being transferred than necessary. By reversing the tracking to track used rather than unused pages, many CPU cycles, and a lot of network bandwidth may be conserved in migrations close to guest instantiation time, or in migrations where a guest's memory space has experienced relatively little use.

While applicable to non-encrypted guests, especially those with a high ratio of unused to used memory, with non-encrypted guests, tracking modification state becomes of limited use for non-live (e.g., suspended guest) migrations since those guests' memory spaces are typically compressible. However, even with non-encrypted guests, there is typically a window of time between when hypervisor begins to instantiate a guest, and when the guest has been running for a long enough time that the guest is self reporting its used, unused, and freed memory pages where application of the present disclosure may greatly enhance the speed and efficiency of potential migrations because during that time, typically every page would need to be flagged for migration in a guest. In addition, running a compression program takes significant processor and memory resources as well as time, so avoiding the transfer of a large amount of unused blank pages would still be a significant latency improvement. Similarly, the techniques described herein also present less benefit in live migrations of guests because for live migration, execution state may need to be constantly maintained since a given memory page may be updated many times before migration is complete, and each of these updates may need to be tracked and transferred, which would not allow tracking of modified pages to be based solely on read only vs. read/write access permission states. However, in deployment situations where an encrypted guest is migrated shortly after being booted, a key characteristic of the memory space of such guests is that it may typically be a correct to treat the majority of the guest's memory space as clean or unmodified pages rather than dirty or modified pages, and therefore tracking and transferring modified pages while recreating the unmodified pages on the destination system may be highly advantageous. In addition, since unmodified pages do not have any data that can be leaked, these pages may be allocated on a destination system without the guest's encryption key, and then encrypted only after the migration of the encrypted guest without compromising security. Therefore, efficient instantiation of encrypted guests allows for enhanced service delivery flexibility in allowing high speed scalability of compute resources using public, shared infrastructure without compromising many of the security advantages enabled by hosting compute services on secured infrastructure. In addition, by enabling the use of shared infrastructure for these computing tasks, overall computing efficiency is improved by reducing the need to deploy underutilized secured hardware.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure, a system comprises a first host with a processor and a first hypervisor; and a second host with a second hypervisor separated from the first host by a network, the first hypervisor executing on the processor to: allocate a requested amount of memory associated with a first guest on the first host; track, as the first guest boots, pages of the requested amount of memory written to by a boot process of the first guest; request the second hypervisor to allocate the requested amount of memory on the second host; transfer all tracked pages written to by the boot process to the second host; and responsive to transferring all tracked pages, send a transfer completion confirmation to the second hypervisor, wherein a second guest that is a migrated copy of the first guest is instantiated on the second host with the transferred pages from the first guest.

Aspects of the subject matter described herein may be useful alone or in combination with one or more other aspects described herein. In a 2nd exemplary aspect of the present disclosure, a system comprises: a means for allocating a requested amount of memory associated with a first guest on a first host with a first hypervisor; a means for tracking, as the first guest boots, pages of the requested amount of memory written to by a boot process of the first guest; a means for requesting a second hypervisor of a second host separated from the first host by a network to allocate the requested amount of memory on the second host; a means for transferring all tracked pages written to by the boot process to the second host; and a means for responsive to transferring all tracked pages, sending a transfer completion confirmation to the second hypervisor, wherein a second guest that is a migrated copy of the first guest is instantiated on the second host with the transferred pages from the first guest.

Aspects of the subject matter described herein may be useful alone or in combination with one or more other aspects described herein. In a 3rd exemplary aspect of the present disclosure, a computer-readable non-transitory storage medium storing executable instructions, which when executed by a computer system, cause the computer system to: allocate a requested amount of memory associated with a first guest on a first host with a first hypervisor; track, as the first guest boots, pages of the requested amount of memory written to by a boot process of the first guest; request a second hypervisor of a second host separated from the first host by a network to allocate the requested amount of memory on the second host; transfer all tracked pages written to by the boot process to the second host; and responsive to transferring all tracked pages, send a transfer completion confirmation to the second hypervisor, wherein a second guest that is a migrated copy of the first guest is instantiated on the second host with the transferred pages from the first guest.

In accordance with a 4th exemplary aspect of the present disclosure, which may be used in combination with any one or more of other aspects described herein (e.g., the 1st, 2nd, or 3rd aspects), wherein the first guest's associated memory on the first host is encrypted with an encryption key stored in the first guest's associated memory by the first hypervisor during the boot process. In accordance with a 5th exemplary aspect of the present disclosure, which may be used in combination with any one or more of other aspects described herein (e.g., the 4th aspect), wherein the second hypervisor is restricted from accessing the encryption key.

In accordance with a 6th exemplary aspect of the present disclosure, which may be used in combination with any one or more of other aspects described herein (e.g., the 1st, 2nd, or 3rd aspects), wherein execution of the first guest is at least one of paused and stopped prior to the hypervisor transferring the tracked pages to the second host. In accordance with a 7th exemplary aspect of the present disclosure, which may be used in combination with any one or more of other aspects described herein (e.g., the 6th aspect), wherein the tracked pages are additionally transferred to a third host and a third guest is instantiated on the third host.

In accordance with a 8th exemplary aspect of the present disclosure, which may be used in combination with any one or more of other aspects described herein (e.g., the 1st, 2nd, or 3rd aspects), wherein the requested amount of memory on the first host is initialized, including by setting all pages of the requested amount of memory to read only. In accordance with a 9th exemplary aspect of the present disclosure, which may be used in combination with any one or more of other aspects described herein (e.g., the 8th aspect), wherein initializing the requested amount of memory additionally includes zeroing all memory addresses in the requested amount of memory. In accordance with a 10th exemplary aspect of the present disclosure, which may be used in combination with any one or more of other aspects described herein (e.g., the 8th aspect), wherein the boot process triggers a respective memory fault each time the boot process attempts to write to a page set to read only, and the first hypervisor sets each page requested by the boot process to read-write in response to each respective memory fault.

In accordance with a 11th exemplary aspect of the present disclosure, which may be used in combination with any one or more of other aspects described herein (e.g., the 1st, 2nd, or 3rd aspects), wherein each page of the requested amount of memory set to a read-write state is tracked as a page written to by the boot process.

Aspects of the subject matter described herein may be useful alone or in combination with one or more other aspects described herein. In a 12th exemplary aspect of the present disclosure, a method comprises: allocating a requested amount of memory associated with a first guest on a first host with a first hypervisor; tracking, as the first guest boots, pages of the requested amount of memory written to by a boot process of the first guest; requesting a second hypervisor of a second host separated from the first host by a network to allocate the requested amount of memory on the second host; transferring all tracked pages written to by the boot process to the second host; and responsive to transferring all tracked pages, sending a transfer completion confirmation to the second hypervisor, wherein a second guest that is a migrated copy of the first guest is instantiated on the second host with the transferred pages from the first guest.

In accordance with a 13th exemplary aspect of the present disclosure, which may be used in combination with any one or more of other aspects described herein (e.g., the 12th aspect), further comprising: encrypting, by the first hypervisor, the first guest's associated memory on the first host with an encryption key stored in the first guest's associated memory during the boot process. In accordance with a 14th exemplary aspect of the present disclosure, which may be used in combination with any one or more of other aspects described herein (e.g., the 13th aspect), wherein the second hypervisor is restricted from accessing the encryption key.

In accordance with a 15th exemplary aspect of the present disclosure, which may be used in combination with any one or more of other aspects described herein (e.g., the 12th aspect), further comprising: initializing the requested amount of memory on the first host by setting all pages of the requested amount of memory to read only. In accordance with a 16th exemplary aspect of the present disclosure, which may be used in combination with any one or more of other aspects described herein (e.g., the 12th aspect), zeroing all memory addresses in the requested amount of memory. In accordance with a 17th exemplary aspect of the present disclosure, which may be used in combination with any one or more of other aspects described herein (e.g., the 12th aspect), further comprising: tracking each page of the requested amount of memory set to a read-write state as a page written to by the boot process.

In accordance with a 18th exemplary aspect of the present disclosure, which may be used in combination with any one or more of other aspects described herein (e.g., the 12th aspect), further comprising: at least one of pausing and stopping execution of the first guest prior to transferring the tracked pages to the second host. In accordance with a 19th exemplary aspect of the present disclosure, which may be used in combination with any one or more of other aspects described herein (e.g., the 12th aspect), further comprising: transferring the tracked pages to a third host; and instantiating a third guest on the third host. In accordance with a 20th exemplary aspect of the present disclosure, which may be used in combination with any one or more of other aspects described herein (e.g., the 12th aspect), wherein the boot process triggers a respective memory fault each time the boot process attempts to write to a page set to read only, and the first hypervisor sets each page requested by the boot process to read-write in response to each respective memory fault.

Aspects of the subject matter described herein may be useful alone or in combination with one or more other aspects described herein. In a 21st exemplary aspect of the present disclosure, a system comprises: a first host with a processor and a first hypervisor; and a second host with a second hypervisor separated from the first host by a network, the first hypervisor executing on the processor to: receive an allocation request for a requested amount of memory from the second hypervisor; allocate the requested amount of memory on the first host; receive a plurality of pages from the second hypervisor corresponding to pages of a memory space of a first guest executing on the second host that have been modified since a boot process of the first guest was initiated; store the plurality of pages in the requested amount of memory on the first host; receive a confirmation from the second hypervisor that transfer of the plurality of pages is complete; and responsive to receiving the confirmation, starting execution of a second guest on the first host with the plurality of pages and the requested amount of memory.

Aspects of the subject matter described herein may be useful alone or in combination with one or more other aspects described herein. In a 22nd exemplary aspect of the present disclosure, a method comprises: receiving, by a first hypervisor of a first host, an allocation request for a requested amount of memory from a second hypervisor of a second host separated from the first host by a network; allocating the requested amount of memory on the first host; receiving a plurality of pages from the second hypervisor corresponding to pages of a memory space of a first guest executing on the second host that have been modified since a boot process of the first guest was initiated; storing the plurality of pages in the requested amount of memory on the first host; receiving a confirmation from the second hypervisor that transfer of the plurality of pages is complete; and responsive to receiving the confirmation, starting execution of a second guest on the first host with the plurality of pages and the requested amount of memory.

Aspects of the subject matter described herein may be useful alone or in combination with one or more other aspects described herein. In a 23rd exemplary aspect of the present disclosure, a system comprises: a means for receiving, by a first hypervisor of a first host, an allocation request for a requested amount of memory from a second hypervisor of a second host separated from the first host by a network; a means for allocating the requested amount of memory on the first host; a means for receiving a plurality of pages from the second hypervisor corresponding to pages of a memory space of a first guest executing on the second host that have been modified since a boot process of the first guest was initiated; a means for storing the plurality of pages in the requested amount of memory on the first host; a means for receiving a confirmation from the second hypervisor that transfer of the plurality of pages is complete; and a means for responsive to receiving the confirmation, starting execution of a second guest on the first host with the plurality of pages and the requested amount of memory.

Aspects of the subject matter described herein may be useful alone or in combination with one or more other aspects described herein. In a 24th exemplary aspect of the present disclosure, a computer-readable non-transitory storage medium storing executable instructions, which when executed by a computer system, cause the computer system to: receive, by a first hypervisor of a first host, an allocation request for a requested amount of memory from a second hypervisor of a second host separated from the first host by a network; allocate the requested amount of memory on the first host; receive a plurality of pages from the second hypervisor corresponding to pages of a memory space of a first guest executing on the second host that have been modified since a boot process of the first guest was initiated; store the plurality of pages in the requested amount of memory on the first host; receive a confirmation from the second hypervisor that transfer of the plurality of pages is complete; and responsive to receiving the confirmation, starting execution of a second guest on the first host with the plurality of pages and the requested amount of memory.

In accordance with a 25th exemplary aspect of the present disclosure, which may be used in combination with any one or more of other aspects described herein (e.g., the 21st, 22nd, 23rd, or 24th aspects), wherein the confirmation includes a manifest of the transferred plurality of pages. In accordance with a 26th exemplary aspect of the present disclosure, which may be used in combination with any one or more of other aspects described herein (e.g., the 21st, 22nd, 23rd, or 24th aspects), wherein the confirmation is sent by the second hypervisor after the plurality of pages is transferred, wherein the first guest's memory space includes additional un-transferred pages. In accordance with a 27th exemplary aspect of the present disclosure, which may be used in combination with any one or more of other aspects described herein (e.g., the 21st, 22nd, 23rd, or 24th aspects), wherein each page of the plurality of pages is in a read-write state on the second host. In accordance with a 28th exemplary aspect of the present disclosure, which may be used in combination with any one or more of other aspects described herein (e.g., the 21st, 22nd, 23rd, or 24th aspects), wherein the requested amount of memory is initialized, including by zeroing all memory addresses in the requested amount of memory. In accordance with a 29th exemplary aspect of the present disclosure, which may be used in combination with any one or more of other aspects described herein (e.g., the 21st, 22nd, 23rd, or 24th aspects), wherein the first guest's associated memory on the second host is encrypted with an encryption key stored in the first guest's associated memory by the second hypervisor during the boot process. In accordance with a 30th exemplary aspect of the present disclosure, which may be used in combination with any one or more of other aspects described herein (e.g., the 29th aspect), wherein the first hypervisor is restricted from accessing the encryption key, and the requested amount of memory is encrypted with the encryption key in response to starting execution of the second guest.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
   a first host with a processor and a first supervisor, and a second host with a second supervisor separated from the first host by a network, the first supervisor configured to execute on the processor to:
   allocate a requested amount of memory associated with a first guest on the first host;
   track, as the first guest boots, first pages of the requested amount of memory written to by a boot process of the first guest, wherein different second non-written pages of the requested amount of memory are not written to by the boot process;
   request the second supervisor to allocate the requested amount of memory on the second host;
   transfer all tracked first pages written to by the boot process to the second host without transferring at least a plurality of the second non-written pages, wherein contents from the first pages and a plurality of initialized pages of the second host that correspond to the second non-written pages of the first host form an initial state to resume the first guest at the second host; and
   responsive to transferring all tracked first pages, send a transfer completion confirmation to the second supervisor, wherein a second guest that is a migrated copy of the first guest is instantiated on the second host with the transferred first pages from the first guest.

2. The system of claim 1, wherein the first guest's associated memory on the first host is encrypted with an encryption key stored in the first guest's associated memory by the first supervisor during the boot process, and
   wherein the second supervisor is restricted from accessing the encryption key.

3. The system of claim 1, wherein execution of the first guest is at least one of suspended, paused, and stopped prior to the first supervisor transferring the tracked first pages to the second host.

4. The system of claim 1, wherein the tracked first pages are additionally transferred to a third host and a third guest is instantiated on the third host.

5. The system of claim 1, wherein the requested amount of memory on the first host is initialized, including by setting all pages of the requested amount of memory to read only,
   wherein the boot process triggers a respective memory fault each time the boot process attempts to write to a page set to read only, and the first supervisor sets each page requested by the boot process to read-write in response to each respective memory fault.

6. The system of claim 1, wherein each page of the requested amount of memory set to a read-write state is tracked as a first page written to by the boot process.

7. The system of claim 1, wherein the first guest is a virtual machine or a container.

8. The system of claim 1, wherein at least one of the first supervisor and the second supervisor is a hypervisor or a host operating system.

9. The system of claim 1, wherein the first host is a secure environment and the second host is a public multi-tenant cloud environment.

10. The system of claim 1, wherein when the tracked first pages are transferred, a majority of the requested amount of memory is the second non-written pages.

11. A method comprising:
    allocating a requested amount of memory associated with a first guest on a first host with a first supervisor;
    tracking, as the first guest boots, first pages of the requested amount of memory written to by a boot process of the first guest, wherein different second non-written pages of the requested amount of memory are not written to by the boot process;
    requesting a second supervisor of a second host separated from the first host by a network to allocate the requested amount of memory on the second host;
    transferring all tracked first pages written to by the boot process to the second host without transferring at least a plurality of the second non-written pages, wherein contents from the first pages and a plurality of initialized pages of the second host that correspond to the second non-written pages of the first host form an initial state to resume the first guest at the second host; and
    responsive to transferring all tracked first pages, sending a transfer completion confirmation to the second supervisor, wherein a second guest that is a migrated copy of the first guest is instantiated on the second host with the transferred first pages from the first guest.

12. The method of claim 11, further comprising:
    initializing the requested amount of memory on the first host by:
    setting all pages of the requested amount of memory to read only; and
    zeroing all memory addresses in the requested amount of memory.

13. The method of claim 11, further comprising:
    tracking each page of the requested amount of memory set to a read-write state as a first page written to by the boot process.

14. The method of claim 11, wherein the transfer completion confirmation is sent to the second supervisor when only the tracked first pages have been transferred.

15. The method of claim 11, further comprising:
    compiling the tracked first pages in a list.

16. A system comprising:

a first host with a processor and a first supervisor, and a second host with a second supervisor separated from the first host by a network, the first supervisor configured to execute on the processor to:

receive an allocation request for a requested amount of memory from the second supervisor;

allocate the requested amount of memory on the first host;

receive a plurality of pages transferred from the second supervisor corresponding to first pages of a memory space of a first guest executing on the second host that have been modified since a boot process of the first guest was initiated, wherein different second non-written pages of the requested amount of memory are not written to by the boot process, and wherein contents from the first pages and a plurality of initialized pages of the first host that correspond to the second non-written pages of the second host form an initial state to resume the first guest at the first host;

store the transferred plurality of pages in the requested amount of memory on the first host;

without receiving at least a plurality of the second non-written pages, receive a confirmation from the second supervisor that transfer of the plurality of pages is complete; and responsive to receiving the confirmation, starting execution of a second guest on the first host with the transferred plurality of pages and the requested amount of memory.

17. The system of claim 16, wherein the confirmation includes a manifest of the transferred plurality of pages.

18. The system of claim 16, wherein each page of the transferred plurality of pages is in a read-write state on the second host.

19. The system of claim 16, wherein the first guest's memory space on the second host is encrypted with an encryption key stored in the first guest's memory space by the second supervisor during the boot process.

20. The system of claim 19, wherein the first supervisor is restricted from accessing the encryption key, and the requested amount of memory is encrypted with the encryption key in response to starting execution of the second guest.

\* \* \* \* \*

UNITED STATES PATENT AND TRADEMARK OFFICE
CERTIFICATE OF CORRECTION

PATENT NO. : 10,866,814 B2
APPLICATION NO. : 16/799299
DATED : December 15, 2020
INVENTOR(S) : Tsirkin et al.

Page 1 of 1

It is certified that error appears in the above-identified patent and that said Letters Patent is hereby corrected as shown below:

In the Specification

In Column 12, Line 43, replace "260K" with --260A'--.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*